June 30, 1942. H. TORMYN 2,287,952
BRAKE DRUM AND METHOD OF MAKING SAME
Filed Aug. 28, 1939 2 Sheets-Sheet 1

Inventor
Herman Tormyn
By Blackmore, Spencer & Flint
Attorneys

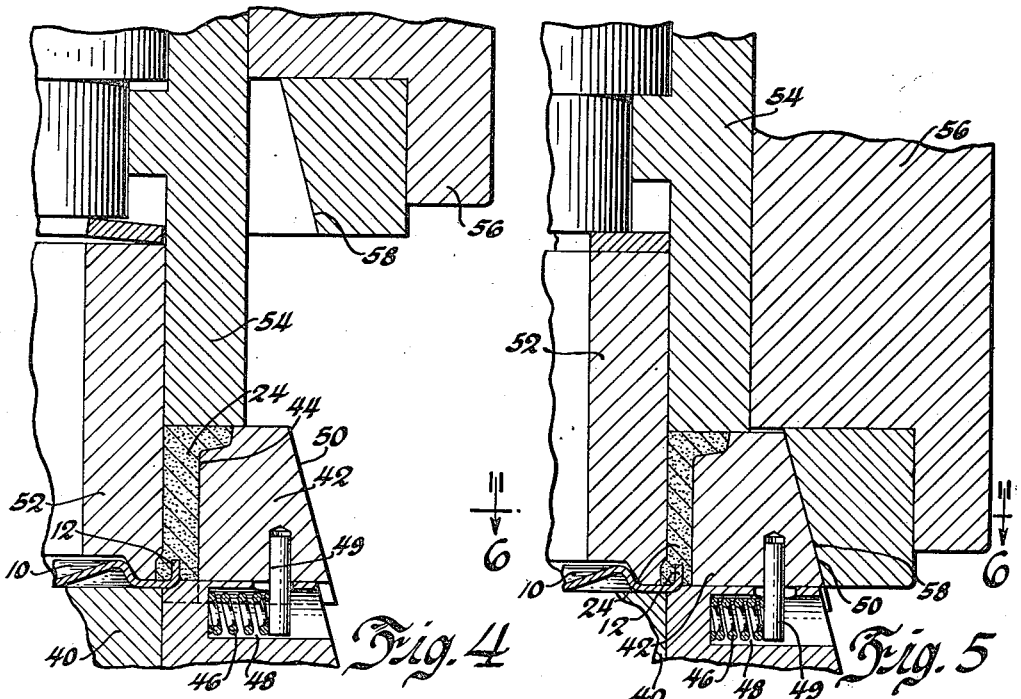
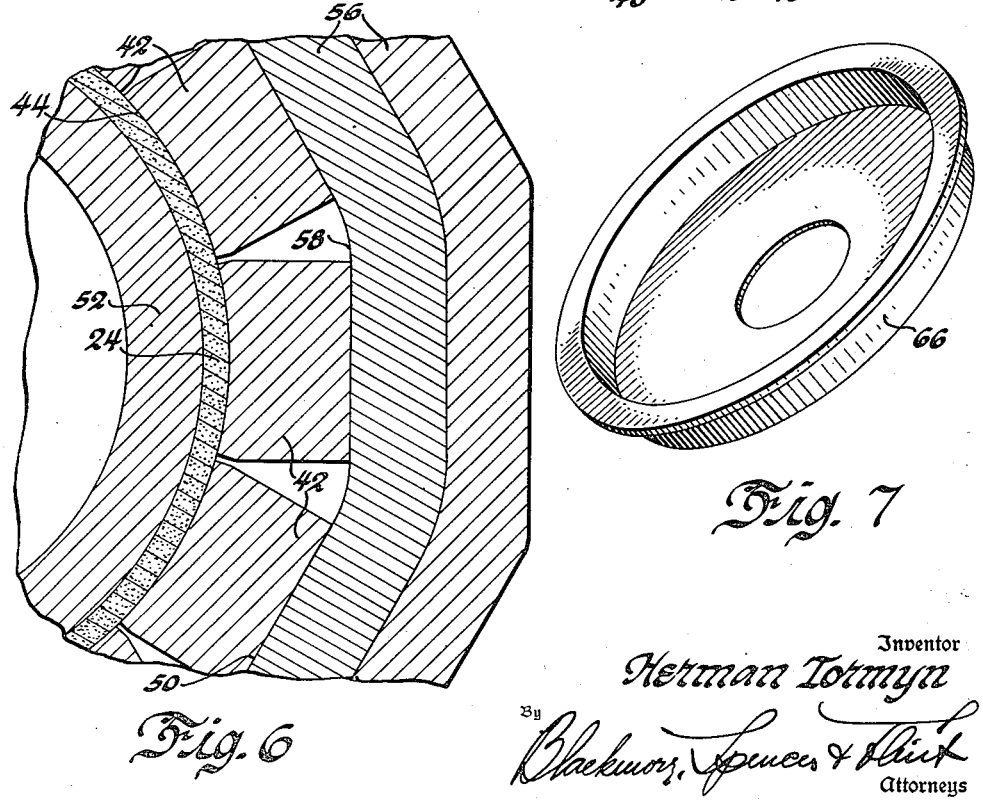

Patented June 30, 1942

2,287,952

UNITED STATES PATENT OFFICE 2,287,952

BRAKE DRUM AND METHOD OF MAKING SAME

Herman Tormyn, Detroit, Mich., assignor to General Motors Corporation, Detroit, Mich., a corporation of Delaware Application August 28, 1939, Serial No. 292,193

10 Claims. (Cl. 29—152.2)

This invention relates to a method of making a brake drum having a braking surface formed of pressed and sintered powdered metal and to the brake drum resulting from the method.

One object of my invention is to provide a new and improved brake drum and method of making the same.

Another object of my invention is an improved brake drum having its braking surface formed of pressed and sintered powdered ferrous metal.

Still another object of my present invention is to provide a brake drum having a braking surface that is score and wear resistant and one that is highly efficient in the braking operation.

It is also an object of my invention to provide a method of making a brake drum whereby expensive machining operations commonly employed in making brake drums are dispensed with.

A further specific object of my invention is to provide a composite brake drum having a frictional or braking surface of pressed and sintered ferrous metal.

Other objects and advantage of my invention will become more apparent as the description proceeds.

Reference is herewith made to the accompanying drawings forming a portion of this specification and illustrating an embodiment of the invention, in which:

Figure 4 is a sectional view showing one form of apparatus that may be used in pressing a brake drum to final form.

Figure 5 is a sectional view of the apparatus of Figure 4 with the several parts in their positions at the conclusion of a pressing operation.

Figure 6 is a sectional view on line 6—6 in Figure 5.

Figure 7 is a view showing the completed composite brake drum.

In accordance with the invention a brake drum is formed having at least its frictional or braking surface formed by pressing metal powder, preferably ferrous metal powder, under high pressure and sintering the same. The entire brake drum may be made of the sintered pressed powder, if desired, but at present it is preferred to utilize a sheet metal backing plate to which the sintered pressed metal is strongly bonded. The iron powder used may be powdered sponge iron, powdered electrolytic iron, or the iron powder may be made by other suitable method. In some applications of the invention the iron powder may contain small amounts of alloying constituents such as carbon, silicon, manganese, etc.

In accordance with one specific embodiment of the invention iron powder is pressed and molded in suitable dies under high pressure into intimate relation with a flange or equivalent portion of a sheet metal backing member such as, for example, sheet steel, and thereafter subjected to a sintering operation at a suitable temperature. After the sintering operation and preferably while heated at a temperature about that used in the sintering operation, the molded portion of the brake drum may be subjected to a second pressing operation to render more dense the somewhat porous structure resulting from the first pressing and sintering operation. The second pressing operation also increases the strength of the bond between the sheet metal backing plate and the sintered portion of the drum formed of the pressed ferrous metal powder. A brake drum having a braking surface formed of pressed and sintered metal powder in accordance with the invention is wear and score resistant and has a soft and smooth braking action.

Figure 1:
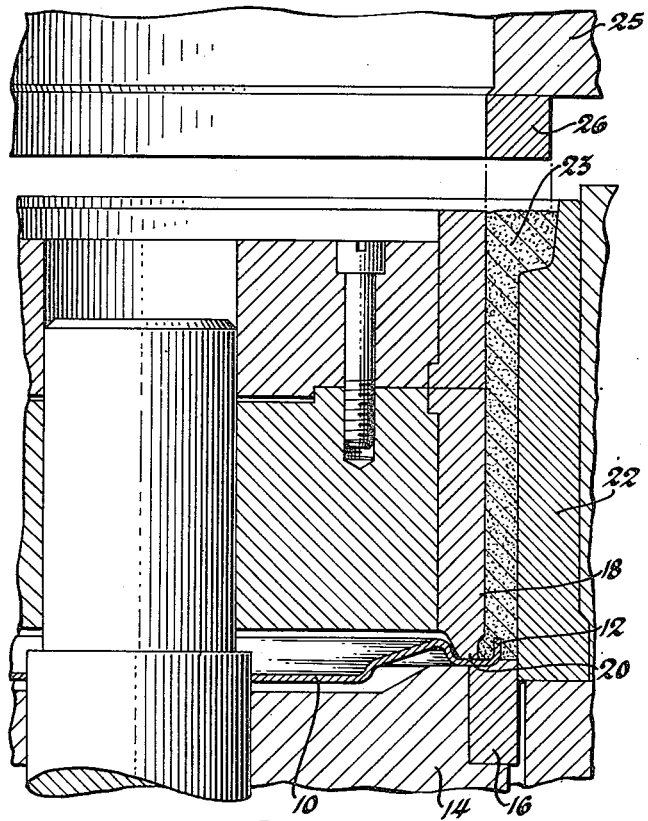
Figure 1 is a sectional view showing a portion of one form of apparatus that may be used in forming a brake drum in accordance with the invention.
Figure 2:
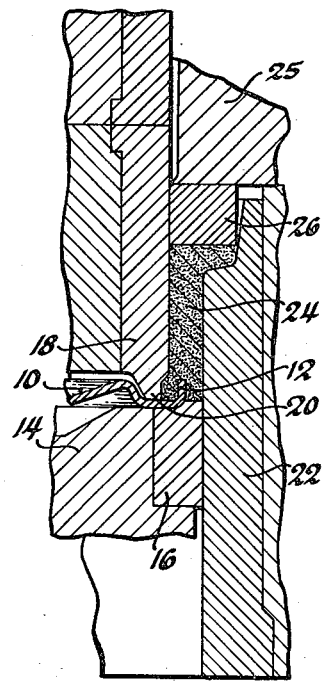
Figure 2 is a sectional view of a portion of the apparatus shown in Figure 1, the parts in Figure 2 being in different position relative to one another than that shown in Figure 1.
Figure 3:
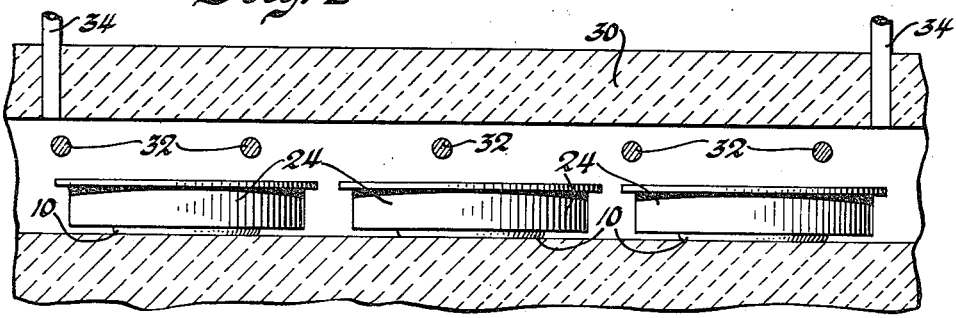
Figure 3 is a diagrammatic view showing a furnace that may be used in carrying out the sintering step in the method.

In the drawings which illustrate one form of apparatus that may be used in making a brake drum in accordance with one embodiment of the invention, 10 is a suitable backing plate having an annular flange 12. In Figure 1 is shown the backing plate in position on element 14 of a suitable press with flange portion 12 supported on annulus 16. Die element 18 has a lip 20 in contact with the upper face of the backing member 10 adjacent the flange thereof to hold the backing plate in position. Die element 18, the ring 16 and outer die element 22 form a pocket which is filled with sufficient powdered iron 23 to form the braking ring portion 24 of the brake drum. An iron powder that will pass through an 80 mesh screen produces satisfactory results, although considerable variation is permissable. An upper die element 25 having a ring portion 26 is mounted above the pocket having the iron powder therein as shown in Figure 1. Relative movement between the die parts presses the particles of iron powder into compact engagement with one another and with the outer portion of the backing plate and flange thereof. A pressure of 30 tons per square inch or more may be used to press the iron powder in the pressing operation just described. Figure 2 illustrates the parts at the conclusion of the pressing operation. The backing plate 10 and the pressed metal powder braking ring portion 24 are then heated to a sintering temperature. For this purpose the furnace illustrated in Figure 3 may be employed. In this figure the reference numeral 30 represents generally a furnace having electric heating elements 32 used for heating the furnace atmosphere and brake drums to the sintering temperature. Suitable passages 34 permit hydrogen or other non-oxidizing, reducing, or protecting medium to enter the furnace. The sintering temperature employed with the pressed ferrous metal powder is about 2000° F. to 2050° F.

The article resulting from the sintering operation comprises a backing plate of sheet metal to which is adherently connected a somewhat porous sintered portion. In order to increase the strength of the sintered portion and improve the connection or bond between the flange of the backing plate and the sintered portion, the sintered composite article may be subjected to a second pressing operation, this preferably being a hot pressing operation at substantially the sintering temperature. It is convenient, therefore, to remove the sintered article from the sintering furnace and immediately press the same to final form without allowing the same to become cool. If desired, the parts may be allowed to cool and they may be thereafter heated and pressed.

One form of apparatus that may be employed in the second pressing operation is shown in Figures 4, 5 and 6. In these figures the sintered article is placed in position on a supporting member 40 having a plurality of slidable jaws 42 having arcuate portions 44 adapted to contact the outer periphery of the brake drum. Springs 46 in openings 48 react against pins 49 fixed to the jaws and tend to bias the several jaws away from the outer periphery of the brake drum. Each jaw has an inclined portion or surface 50. Contacting the inner or braking face of the brake drum is a die member 52. The upper edge of the sintered portion of the brake drum is engaged by a sleeve member 54.

An upper die member 56 has an inclined surface 58 adapted to engage inclined portions 50 to move the several jaws 42, inwardly against the pressure of springs 46 to compress the sintered body. The second pressing operation occurs upon a relative movement of supporting member 40 and associated parts with respect to the upper die member as will be readily understood. Figure 5 shows the relative positions of the several parts at the conclusion of the second pressing operation. The second pressing operation densifies the sintered metal and presses the somewhat porous sintered metal into the final shape desired. This greatly strengthens the metal and assists in forming a strong bond between the backing plate 10 of the brake drum and the portion formed of sintered powdered metal. Pressures of about 30 tons or more per square inch have given satisfactory results.

By pressing and sintering the metal powder the brake drum may be made into substantially the form desired in the final article. In this way expensive machining operations that are needed in common commercial brake drum manufacture are obviated. In Figure 7 the completed composite brake drum is indicated by reference numeral 66.

A brake drum formed as described is one that has extremely good braking action and is strong and highly resistant to wearing and scoring. Brake drums having their frictional surfaces formed of pressed and sintered iron powder are characterized by the smoothness of their operation and by the ease with which proper adjustment of the brakes is maintained during use.

Various changes and modifications of the embodiment of my invention described herein may be made by those skilled in the art without departing from the spirit and principle of my invention and I do not intend to limit the patent granted for my invention except as necessitated by the prior art.

I claim:

1. A method of making a metallic brake drum having an upwardly extending braking ring adjacent the outer periphery of the drum which comprises, pressing ferrous metal powder under high pressure into annular form to provide at least the upwardly extending braking ring portion of the brake drum, and sintering said upwardly extending braking ring portion of pressed ferrous metal powder.

2. A method of making a metallic brake drum having a braking ring at the outer portion of the drum which comprises, pressing ferrous metal powder under high pressure into annular shape to provide at least the braking ring portion of the brake drum, sintering the braking ring portion of pressed powdered ferrous metal, and thereafter pressing the sintered brake ring portion to densify it and to shape it to the form desired.

3. A method of making a composite metallic brake drum having a sheet metal backing plate and a metallic sintered braking ring intimately connected thereto which comprises, providing a backing plate of sheet metal, pressing powdered ferrous metal under high pressure into intimate contact with the outer periphery of said backing plate to form an annular braking ring portion, and heating the braking ring portion of pressed powdered ferrous metal to a sintering temperature.

4. A method of making a composite metallic brake drum having a sheet metal portion and a sintered metallic braking ring portion intimately connected thereto which comprises, providing a backing plate of sheet metal having an upstanding flange at the outer periphery thereof, pressing under high pressure powdered ferrous metal into intimate contact with the flange to form a braking ring portion, heating at least the flanged portion of the backing plate and pressed powdered ferrous metal braking ring portion to a sintering temperature to cause the ferrous metal braking ring portion to become sintered and strongly bonded to the flange of the backing plate, and thereafter compressing the sintered ferrous metal braking ring to densify it and to shape it to the form desired.

5. A method of making a composite metallic brake drum having a sheet metal portion and a sintered metallic braking ring portion intimately connected therewith which comprises, providing a backing plate of sheet steel having an upstanding flange at the outer periphery thereof, pressing under high pressure powdered ferrous metal into intimate contact with the flange to form a braking ring portion, heating to a sintering temperature under non-oxidizing conditions said backing plate and said braking ring portion of pressed ferrous metal powder to cause the braking ring to be sintered and strongly bonded to said flange, and pressing the sintered braking ring portion at substantially a sintering temperature to densify it and to shape it to final form.

6. A method of making a composite metallic brake drum having a sheet steel portion and a sintered ferrous metal braking ring portion intimately connected therewith which comprises, providing a backing plate of sheet steel having an upwardly extending flange at the outer periphery thereof, pressing under a pressure of about at least 30 tons per square inch powdered ferrous metal into intimate contact with said flange to form a braking ring portion, heating in a non-oxidizing atmosphere the backing plate and braking ring portion to a sintering temperature of about 2000° F. to 2050° F., and thereafter pressing the sintered braking ring portion at substantially the sintering temperature to densify it and to shape it to final form.

7. A metallic brake drum having an upwardly extending braking ring portion at the periphery of the drum, said braking ring at least being formed of powdered ferrous metal which has been pressed under high pressure into substantially its final form and heated to a sintering temperature.

8. A composite metallic brake drum comprising a sheet metal member and a braking ring portion at the periphery of said sheet metal member strongly bonded thereto, said braking ring being formed of pressed and sintered powdered ferrous metal.

9. A composite metallic brake drum comprising, a sheet steel backing plate having an upwardly extending flange at the periphery thereof and a braking ring portion of pressed and sintered ferrous metal powder intimately and strongly bonded to said flange.

10. A method of making a composite metallic brake drum having a sheet metal portion and a sintered metallic braking ring portion intimately connected thereto which comprises, providing a backing plate of sheet metal having an outer peripheral portion, pressing under high pressure powdered ferrous metal into intimate contact with the outer peripheral portion to form a braking ring portion, heating at least the outer peripheral portion of the backing plate and pressed powdered ferrous braking ring portion to a sintering temperature to cause the ferrous metal braking ring portion to become sintered and strongly bonded to the outer peripheral portion of the backing plate, and thereafter compressing the sintered ferrous metal braking ring to densify it and shape it to the form desired.

HERMAN TORMYN.